Feb. 18, 1941.   E. STROHFELDT   2,232,083
METHOD OF PRODUCING SURFACES OF HIGH HEAT RADIATION
Filed Aug. 24, 1938
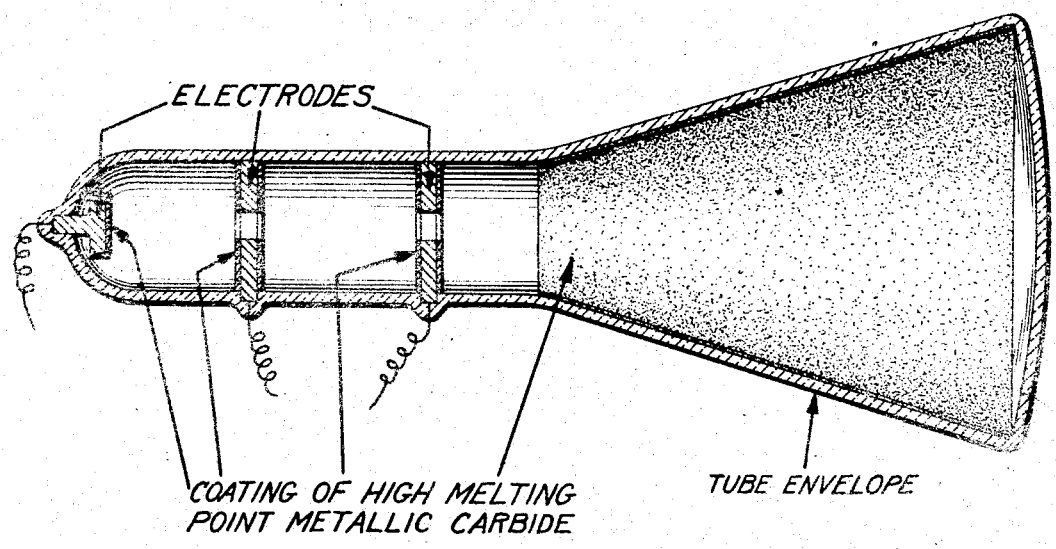
INVENTOR
ERWIN STROFELDT
BY
ATTORNEY Patented Feb. 18, 1941

2,232,083

UNITED STATES PATENT OFFICE 2,232,083

METHOD OF PRODUCING SURFACES OF HIGH HEAT RADIATION

Erwin Strohfeldt, Berlin, Germany, assignor to C. Lorenz Aktiengesellschaft, Berlin-Tempelhof, Lorenzweg, Germany, a company Application August 24, 1938, Serial No. 226,177
In Germany September 6, 1937

1 Claim. (Cl. 250—27.5)

The present invention relates to methods of producing surfaces of high heat radiation and low secondary electron emission, particularly in electric discharge devices and consists in certain features of novelty which will readily be understood from the following description and be pointed out in the appended claims.

For the purposes of securing a higher heat radiation, the outer surfaces of electron tubes, for example the superficies of the anode electrodes in transmitter and receiver tubes are provided with a coating which involves higher heat radiation than the metallic surface as such.

It is also a known expedient in connection with Braun tubes to blacken the inner wall of the discharge vessel by means of a coating in order to avoid light deflections at this wall and in order to simultaneously prevent emission of secondary electrons. It is a well known expedient to use soot for this purpose since this substance involves useful optical properties. It is also possible to employ metal oxides for obtaining such blackening. However, all these substances or materials suffer under the disadvantage that considerable difficulties prevail on removing residual gases therefrom, and that these substances are vaporized or disintegrated at high temperatures.

It has also been proposed to employ metals, such as tungsten or molybdenum in a finely dispersed condition. These metals constitute chemical composition with residual gases at relatively low temperatures and, moreover cause an undesired emission of secondary electrons.

According to the main feature of the present invention, these disadvantages are obviated by producing surfaces consisting of carbides having a high melting point, such as zirconium carbide, tungsten carbide, molybdenum carbide or similar metallic compositions.

The above mentioned metallic compositions are characterized by their particularly high melting point and their extreme stability with respect to thermical, chemical and other disintegrating influences. These compositions, moreover, create a considerably lower electron emission than their metallic components. It is not necessary to merely employ such carbides since it will be possible to use compositions of different carbides or to mix a carbide with soot or other disperse metals such as tungsten, molybdenum, nickel, cobalt and so forth.

According to a further feature of the invention it is not necessary to employ previously produced carbides since it is possible to apply the metals or their oxides mixed with soot or a carbon producing substance such as starch, sugar or similar, on a supporting body and to convert these metals or oxides into corresponding carbides by heat treatment in vacuum, in hydrogen or in any other inert gas. Furthermore, carbides may also be produced by heating the corresponding metals in a disperse condition in a carbonaceous atmosphere in which case the admixture of carbon in solid form may be entirely or partially omitted.

The above mentioned surfaces or coatings may according to still a further feature of the invention be produced by spraying an emulsion, for instance in water or alcohol, by admixing a gluten which for instance may be sugar or collodion. After such surface or coating has been produced, a protecting layer may be applied thereon. It is also possible to intimately unite the coating and the supporting body in a sintering process. Metallic coatings which are subsequently converted into a carbide may be applied by spraying or vaporizing the metals or their corresponding compositions, or even by means of cathode sputtering. In one particular aspect the metal layer is applied as a solute salt such as ammonium tungstenate whereupon this layer is converted in the corresponding metal oxide or metal merely by applying heat or in a chemical reduction. The surface of the supporting member may be roughened prior to the application of the coating in order to secure perfect sticking between these two members.

The coating in Braun tubes may for instance be produced in such manner that the inner surface of the glass envelope is at first coated with a thin layer of metal, such as silver whereupon a film or layer of a carbide having a high melting point is applied on the first mentioned coating.

The single figure in the drawing illustrates a tube constructed in accordance with the method of my invention.

What is claimed is:

A method of producing surfaces of high heat radiation and low secondary emission which method comprises selecting at least one carbide from the group consisting of zirconium carbide, tungsten carbide, molybdenum carbide, boric carbide, and silicon carbide, emulsifying said carbide in a fluid from the group consisting of water and alcohol, spraying a layer of said emulsion on a supporting surface, and coating said layer of emulsion with a protecting layer of collodion.

ERWIN STROHFELDT.